US006846537B2

(12) United States Patent
Wheatley et al.

(10) Patent No.: US 6,846,537 B2
(45) Date of Patent: Jan. 25, 2005

(54) CARBON FIBER REINFORCEMENT MATERIAL

(76) Inventors: Donald G. Wheatley, 4451 Ford Rd., Ann Arbor, MI (US) 48105; Donald E. Wheatley, 1119 Wright St., Ann Arbor, MI (US) 48105

( * ) Notice: Subject to any disclaimer, the term of this patent is extended or adjusted under 35 U.S.C. 154(b) by 39 days.

(21) Appl. No.: 09/903,414

(22) Filed: Jul. 11, 2001

(65) Prior Publication Data

US 2002/0071932 A1 Jun. 13, 2002

Related U.S. Application Data

(63) Continuation-in-part of application No. 09/736,853, filed on Dec. 13, 2000, now Pat. No. 6,746,741.

(51) Int. Cl.$^7$ ................................................. B32B 3/26
(52) U.S. Cl. .................... 428/40.1; 428/41.5; 428/41.7; 428/41.8; 428/42.1; 428/408; 428/913; 442/85; 442/103; 442/149; 442/179
(58) Field of Search ............................... 428/40.1, 41.5, 428/41.7, 41.8, 42.1, 408, 913; 442/85, 103, 149, 179

(56) References Cited

U.S. PATENT DOCUMENTS

| | | | | |
|---|---|---|---|---|
| 3,239,403 A | * | 3/1966 | Williams | .................... 156/275 |
| 4,916,874 A | | 4/1990 | McCoy et al. | |
| 5,640,825 A | | 6/1997 | Ehsani et al. | |
| 5,649,398 A | | 7/1997 | Isley, Jr. et al. | |
| 5,845,450 A | | 12/1998 | Larsen | |
| 5,894,003 A | | 4/1999 | Lockwood | |
| 6,145,260 A | | 11/2000 | Morton | |
| 2002/0071925 A1 | * | 6/2002 | Wheatley | .................... 428/40.1 |

FOREIGN PATENT DOCUMENTS

JP    2000-265141    *  9/2000

OTHER PUBLICATIONS

ACI Structural Journal, Technical Paper, Title No. 91–S17, Mar.–Apr. 1994, "Strengthening Of Initially Loaded Reinforced Concrete Beams Using FRP Plates", by Alfarabi Sharif, G.J. Al–Sulaimani, I.A. Basunbul, M.H. Baluch and B.N. Ghaleb.
ACI Structural Journal, Technical Paper, Title No. 91–Ss34, May–Jun. 1994, "Fiber Composites For New And Existing Structures:", By Hamid Saadatmanesh.

* cited by examiner

Primary Examiner—Nasser Ahmad
(74) Attorney, Agent, or Firm—Harness, Dickey & Pierce, P.L.C.

(57) ABSTRACT

An article and method for reinforcing structural members is provided. The article comprises a carbon fiber material, preferably a carbon fiber mesh with a roughened surface defined by an epoxy resin. The article has lateral fibers woven into longitudinal carbon fibers that are in tension, creating a mesh. An epoxy resin is applied to the fiber mesh to form a rigidified fiber mesh tape once the resin is cured. To obtain a roughened surface a plastic sheet is removably attached to the surface of the fiber mesh. The plastic sheet is removed thereby exposing a roughened carbon fiber surface defined by the epoxy. The rigidified fiber mesh tape is adhered to the structural member by applying a second epoxy to the structural member. The roughened surface of the rigidified carbon fiber mesh material is then joined to the second epoxy resin. To firmly adhere the fiber mesh to the structural member an impermeable material and a plastic barrier are placed above the article and the structural member. A uniform pressure is then applied with the help of an external vacuum pump till the second epoxy cures and the fiber mesh firmly adheres to the reinforced member.

20 Claims, 5 Drawing Sheets

CARBON FIBER REINFORCEMENT MATERIAL

CROSS-REFERENCE TO RELATED APPLICATIONS

This application is a continuation-in-part application of application No. 09/736,853 filed in the United States Patent and Trademark Office on Dec. 13, 2000 now U.S. Pat. No. 6,746,741.

BACKGROUND OF THE INVENTION

This invention relates to a product for use in reinforcing structures and a method for attaching the product to the structure and in particular to reinforce concrete walls using carbon fiber material with epoxy adhered to the carbon fiber material. The invention further includes a rigidified mesh of carbon fiber material designed for adherence to a structural element.

DESCRIPTION

Walls constructed of concrete blocks are well known in the field of construction and have been extensively used for both above ground and basement walls. Such concrete walls constructed in this manner are generally capable of supporting residential and light commercial structures and are relatively inexpensive to manufacture and repair.

In order to construct a concrete wall, individual blocks are laid end to end and successive rows or courses are stacked thereon. Mortar between each adjacent block and row secures the wall together. These walls are such that they have excellent compressive strength to support structures placed upon them. However, these walls are inherently weak with respect to lateral loads and are particularly susceptible to cracking from water pressure. This inherent weakness of concrete walls is attributable to the structural characteristics of the concrete walls themselves and the mortar joints at which they are connected. Walls constructed in this manner are relatively strong in compression and are thus well suited for supporting overlying structures. However, both the concrete material and particularly the mortar joints are weak in tension, and when subjected to a tensile force, they tend to separate relatively easily.

Water penetrating deeply into the soil adjacent a basement wall causes substantial lateral movement of the expanding soil against the wall. Over a period of time, block or concrete walls develop diagonal cracks at the ends and vertical cracks near their centers. Such cracks can admit water under pressure from the surrounding soil and, if left untreated, can progressively widen and eventually facilitate collapse of the entire structure with resultant damage to the structure supported on it. In addition to developing such cracks, concrete walls typically either bow inwardly and such bowing or tilting steadily worsens with the weight of the overlying structure. The water pressure exerts a compressive force at the outer end, therefore, basement wall cracks tend to develop on the inside of such walls.

One of the traditional methods of repairing the leaks and cracks and relieving the external pressure is to drill holes and provide for channeling of the water away on the inside. Yet another method for repairing cracks and leaks is to inject an epoxy resin into the cracks. Although these methods will prevent further water from entering the cracks they do not bind the concrete walls and prevent further cracking or bowing of the concrete walls.

Yet another means of correcting the cracks in the walls is to use fiberglass cloth with epoxy or polyester resin. Fiberglass has good tensile properties and can carry the load on the interior of the basement walls that is in tension. However, one of the major drawbacks with this method is that mixing the epoxy or polyester and wetting out the fabric is time consuming and messy.

In recent years, technology has developed whereby the concrete walls are reinforced using precut strips of carbon fiber. This prevents the walls from cracking or collapsing. However, precut carbon fiber strips have to be cleaned and roughened, commonly done through sanding, to provide mechanical adhesion with the walls. The sanding process is not only time consuming, but is completely dependent on the skill of the operator sanding the surface of the strip. Sanding also may not remove oil or waxy materials and may spread such contaminants with a detrimental affect on bonding. This results in extra cost in transporting and storing the precut strips.

With the limitations of the prior art in mind, it is an object of the present invention to provide an article for reinforcing a structure element to effectively resist bending or other lateral forces applied to the structure element.

Another object of the present invention is to provide an article that does not require any sanding to provide mechanical adhesion in order to attach the article to the structural element and one which will remain sufficiently clean at a job site.

It is yet another object of the present invention to provide an article that prevents air pockets from forming, that inhibits micro-crack propagation, and prevents thick glue areas from developing.

It is yet another object of the present invention to provide a method whereby an article for use in reinforcing is firmly adhered to the structural element, thereby reinforcing the structural member.

It is yet another object of the present invention to use existing materials to apply uniform pressure to firmly adhere the article to the structural element, thereby resulting in a strong reinforced structural member.

Another object of the present invention is to provide a product and method which is economical, efficient in operation, and capable of a long operating life.

SUMMARY OF THE PRESENT INVENTION

In accordance with the preferred embodiment of the present invention, an article (a reinforcing member) and method for reinforcing structural elements, such as concrete walls, support beams and the like, are provided.

The article in accordance with the present invention comprises a carbon fiber strip with an exposed roughened surface. In order to make the article, epoxy resin is applied to carbon fibers. The epoxy resin is allowed to permeate the thickness of the carbon fibers. Due to the uneven surface of the carbon fibers, a thin layer of epoxy forms on a top or exterior of the carbon fiber. A plastic cover sheet is then placed on top of the carbon fiber. Carbon fiber material with the epoxy and the plastic fiber is then subjected to high heat and pressure to cure the epoxy thereby forming the carbon fiber into a rigid sheet, with an adhered cover sheet, that can be cut into strips. At the job site, the cover sheet is readily removed and the resultant sheet of carbon fiber will have a roughened surface defined by the epoxy resin where it had adhered to the cover sheet. The cover sheet keeps out greases and oils that sanding may not remove.

In an alternate embodiment of the present invention, the article comprises a rigidified carbon fiber mesh tape. The mesh tape is comprised of a number of carbon fibers woven together to form a rigidified matrix. When bonded to a structural element, the bonding agent flows through the mesh, eliminating air pockets and thick glue areas. Moreover, propagation of micro-cracks formed between fibers is limited to the spaces between fibers and cannot propagate along the mesh tape.

The method of adhering the article to a structural element comprises the steps of applying a second epoxy resin to the structural element; adhering the article to the second epoxy resin; allowing the second resin to cure while applying pressure to the article and structural element. Pressure may be applied through use of an overlying plastic sheet, the edges of which are sealed with the help of an adhesive to the structural element. A uniform pressure is applied with the help of an external vacuum pump and the vacuum is applied until the epoxy is cured and the article is firmly fixed to the structural element.

DETAILED DESCRIPTION OF THE PREFERRED EMBODIMENT

The following description of the preferred embodiment is merely exemplary in nature, and is in no way intended to limit the invention, or its application, or uses.

Figure 1:
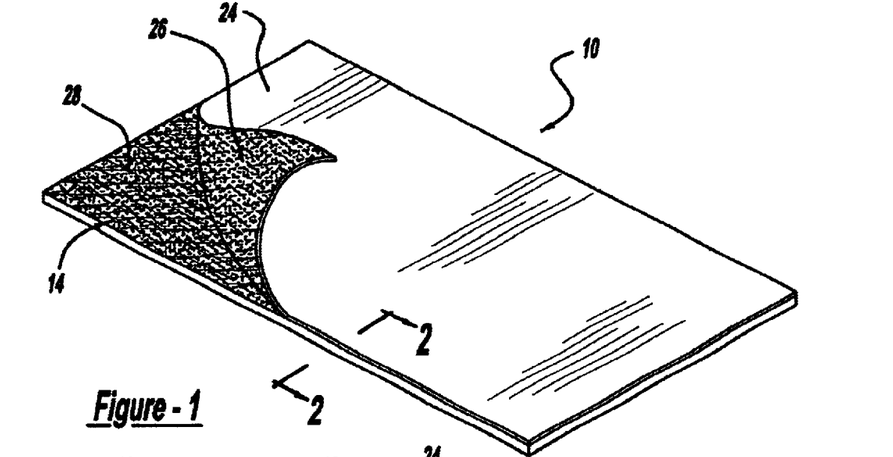
FIG. 1 is a perspective view of the reinforcing article in accordance with the teachings of the present invention.
Figure 3:
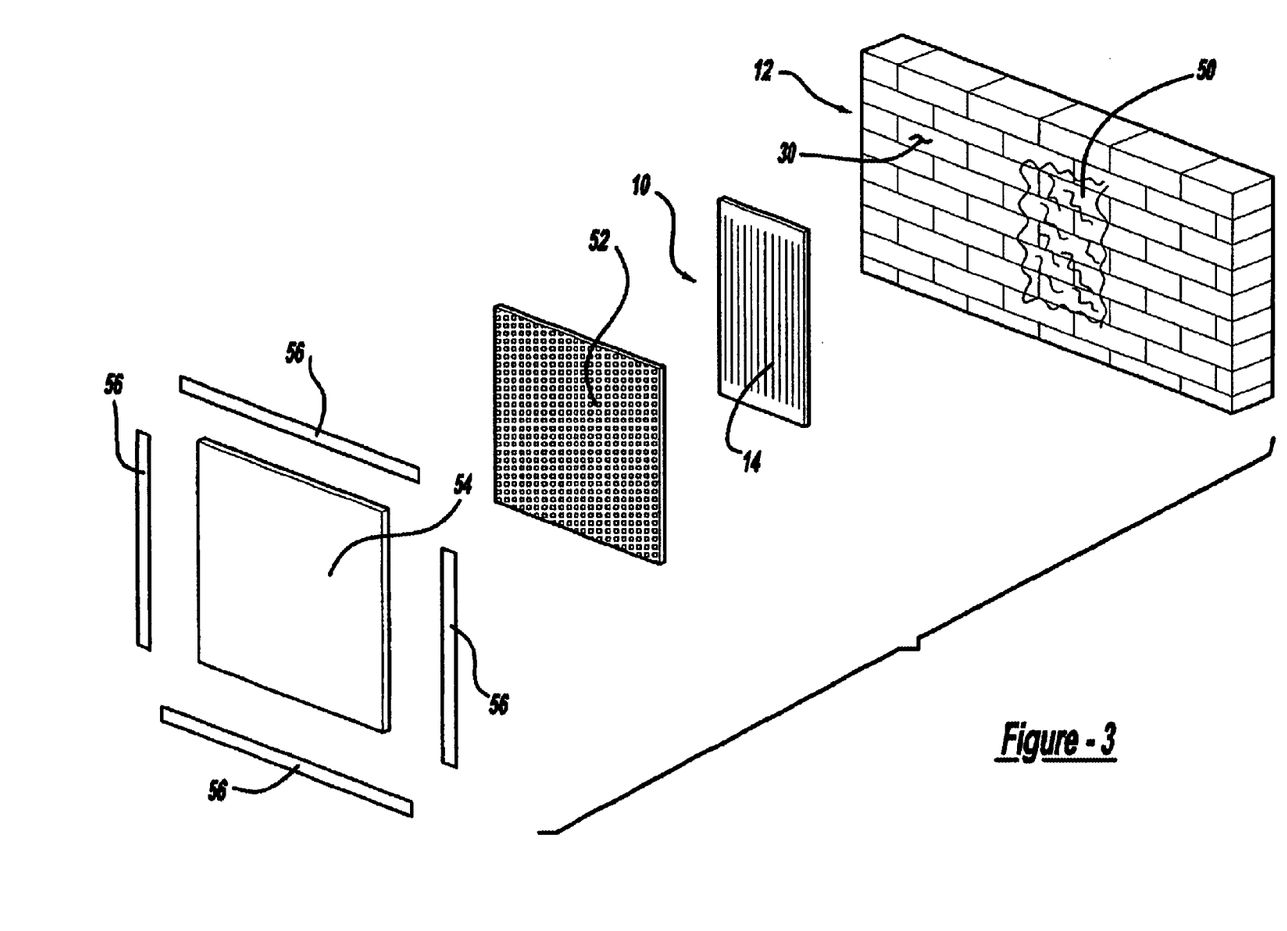
FIG. 3 is an exploded view of the various elements used to adhere the reinforcing article to a structural element in accordance with the teachings of the present invention.

Referring now to the drawings, shown in FIG. 1 is an article, a carbon fiber strip assembly 10 (here after just strip 10) for use in reinforcing structure element 12, such as a concrete block wall, as seen in FIG. 3. In accordance with the teachings of the present invention, the strip 10 comprises a carbon fiber sheet 14 having a roughened surface 28 exposed or produced upon removal of a cover sheet 24.

To obtain the strip 10, a layer of carbon fiber 13 having a first surface 16 and a second surface 18, is provided. The first surface 16 and the second surface 18 of the carbon fiber 13 define a thickness 20. The fibers (not shown specifically in the drawings) of the carbon fiber 13 are generally axially oriented with respect to the strip 10 for good tensile strength as is well known.

Figure 2:
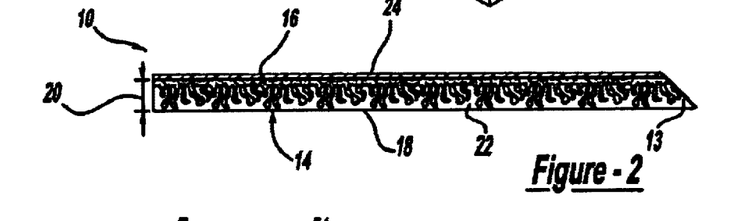
FIG. 2 is a sectional view taken substantially along line 2—2 in FIG. 1 of the present invention.

Referring in particular to FIGS. 1 and 2, a first epoxy resin 22 is applied to either the first surface 16 or the second surface 18 of the carbon fiber 13. In the preferred embodiment as illustrated in the drawings, the epoxy resin 22 is applied to the first surface 16 of the carbon fiber 13. Since the fibers in the carbon fiber 13 defines gaps or voids between them, the epoxy resin 22 permeates the entire thickness 20 of the carbon fiber 13 and a thin layer or at least some of the epoxy resin 22 remains on the surface 16 of the carbon fiber 13. In the preferred embodiment, the epoxy resin has low viscosity such that when applied to the carbon fiber material it permeates the fibers.

Figure 6:
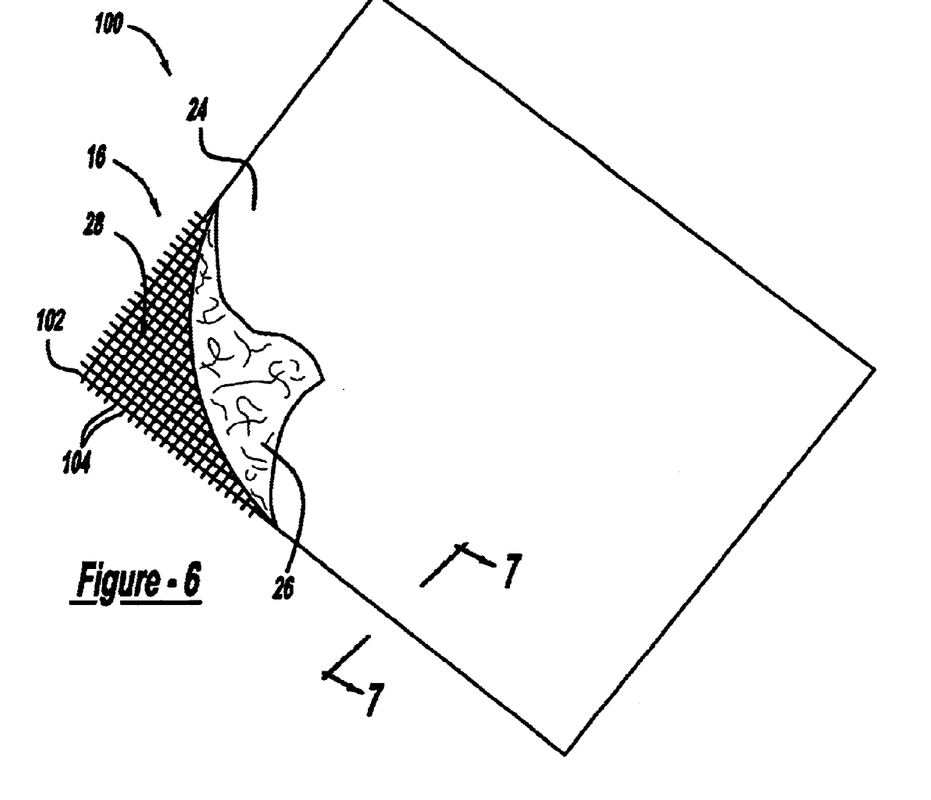
FIG. 6 is a perspective view of a rigidified fiber mesh tape reinforcing article in accordance with the present invention.
Figure 7:
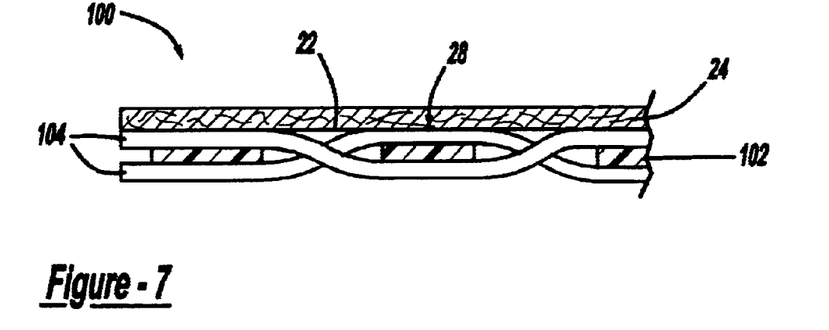
FIG. 7 is a sectional view taken substantially along line 7—7 in FIG. 6 of the rigidified fiber mesh tape according to the alternate embodiment of the present invention.
Figure 8:
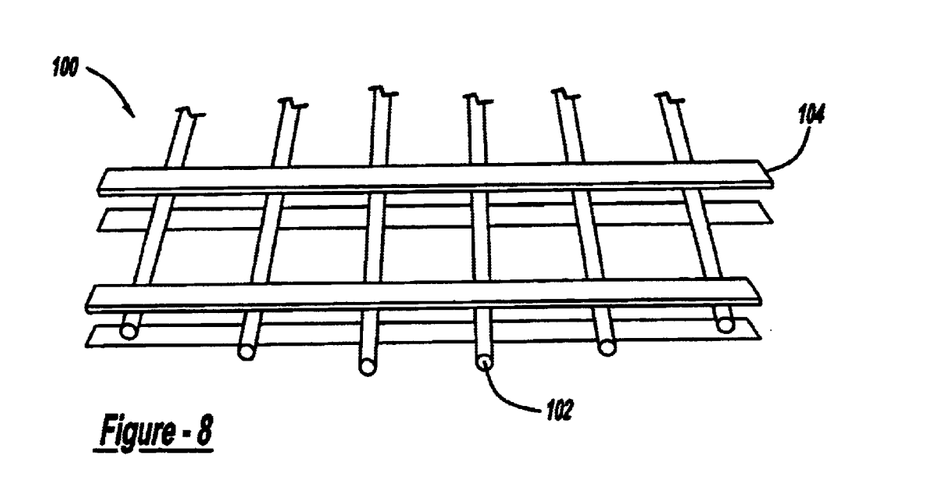
FIG. 8 is a perspective view of an alternative weave pattern of the rigidified fiber mesh tape according to the present invention.

An alternate embodiment of the invention, shown in FIGS. 6–9, is a rigidified fiber mesh tape 100, for use in reinforcing structure element 12. The rigidified fiber mesh tape 100 comprises a number of longitudinal fibers 102 and a number of lateral or transverse fibers 104. The longitudinal fibers 102 run parallel to one another and are in tension. As best seen in FIG. 7, the lateral fibers 104 are woven into the longitudinal fibers 102, the lateral fibers 104 alternating from a position above the longitudinal fibers 102 to a position below the longitudinal fibers 102. Alternatively, as best seen in FIG. 8, the lateral fibers 104 sandwich the longitudinal fibers 102. In other words, the lateral fibers 104 are layered on top and below the longitudinal fibers 102, providing a fiber mesh 100 with a lower manufacturing cost. A further reduction of manufacturing cost may be achieved by providing only one of the layers of lateral fibers 104, either on top or below.

Figure 9:
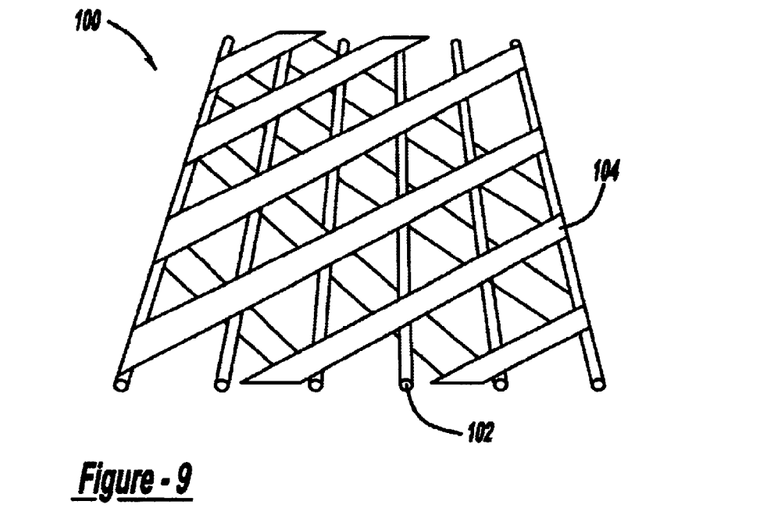
FIG. 9 is a perspective view of an alternate weave pattern of the rigidified fiber mesh tape reinforcing article in accordance with the present invention.

The longitudinal fibers 102 and lateral fibers 104 may be of any cross-sectional shape, such as flat (ribbon like), rectangular, oval or round. In the preferred embodiment, the lateral fibers 104 have a flat cross-section, as seen in FIGS. 7–9, providing a large surface area to contact the structural element 12 and providing a low bending stiffness in the plane of the reinforcement strip. Alternatively, an elliptical cross-section (not particularly shown) may be used for the longitudinal 102 or transverse fibers 104 to provide similar benefits.

As shown in FIGS. 6–8, the lateral fibers 104 are generally at 90-degree angles (transverse) to the longitudinal fibers 102. In an alternate embodiment, as shown in FIG. 9, the lateral fibers 104 may be at 45-degree angles to the longitudinal fibers 102, or some angle between 45-degrees and 90-degrees. In a 45-degree fiber orientation, the lateral fibers 104 tend to be loaded in tension along with the longitudinal fibers 102.

Generally speaking, the longitudinal fibers 102 and lateral fibers 104 may be spaced anywhere from over 1 inch apart to less than 1/32 inches apart so long as the spacing is sufficient to allow adhesive to flow between the fibers 102, 104, as will be discussed in detail herein. The rigidified fiber mesh tape 100 has a roughened surface 28 exposed or produced upon removal of a cover sheet 24, as will be discussed in detail herein. In the preferred embodiment, the fibers 102, 104 are made of pre-cured carbon, although any material providing flexibility and tensional strength may be used. Moreover, longitudinal fibers 102 and lateral fibers 104 may be of different materials.

In the alternate embodiment as shown in FIG. 6, the epoxy resin 22 (discussed above) is applied to the first surface 16 of the rigidified fiber mesh tape 100 and a thin layer or at least some of the epoxy resin 22 remains on the surface 16 of the rigidified fiber mesh tape 100. It should be noted that the openings between the longitudinal fibers 102 and lateral fibers 104 remain unobstructed.

As mentioned above, to provide a strong bond between the reinforcing product 10 or rigidified fiber mesh tape 100 and the reinforced structural element 12, it is important to have the surface of the article 10 or rigidified fiber mesh tape 100 clean and roughed. In order to keep the surface clean and provide a roughened surface, over the layer of epoxy resin 22, on the surface 16 (and optionally on the surface 18), is applied a flexible cover sheet 24 of impermeable textile, nylon, or plastic material. The side of the cover sheet 24 in contact with the epoxy resin 22 preferably exhibits a texture, such as a woven texture surface 26. The carbon fiber 13 or rigidified fiber mesh tape 100, with the epoxy resin 22 and the cover sheet 24 applied, are subject to high temperature and pressure, via known techniques, allowing the epoxy resin 22 to cure. Once the epoxy resin 22 has cured, the result is a rigid carbon fiber sheet 14 or rigidified fiber mesh tape 100 having a removable cover sheet 24 covering one or both surfaces thereof. This rigid carbon fiber sheet 14 or rigidified fiber mesh tape 100 may then be cut or sawn into the desired sizes forming the strip 10. In this form, the strip 10 or rigidified fiber mesh tape 100 can be stored and/or shipped to a job site for use. With the rigidified fiber mesh tape 100, the resin applied during the manufacture of the open fabric tends to fill the window between the mesh. When the textured cover sheet is removed, these windows remain adhered to the cover sheet and leave the openings clear. Thus, the cover sheet provides both a roughened surface, but also open windows.

At the job site, the cover sheet 24 prevents dirt, grease and other debris from coming into contact with the carbon fiber strip 14 or rigidified fiber mesh tape 100. Immediately prior to use, the cover sheet 24 is removed, or more accurately peeled away, from the surface 16 of the carbon fiber strip 14 or rigidified fiber mesh tape 100 leaving exposed a clean roughened surface 28. This roughened surface 28 is a result of at least two factors, individually or in combination. First, the textured surface 26 of the cover sheet 24 causes an impression to be formed in the epoxy resin 22 on the surface 16 as it cures. Second, as the cover sheet 24 is removed from the carbon fiber sheet 14, some of the epoxy resin 22 remains adhered to the plastic sheet 24 and breaks away from the carbon fiber sheet 14 or rigidified fiber mesh tape 100.

As illustrated in the drawings, the strips 10 or rigidified fiber mesh tape 100 are pre-cut and provided in suitable lengths for their intended use. However, it is possible to use large sheets and/or cut them to the required sizes before adhering them to reinforce a structural element 12.

Figure 4:
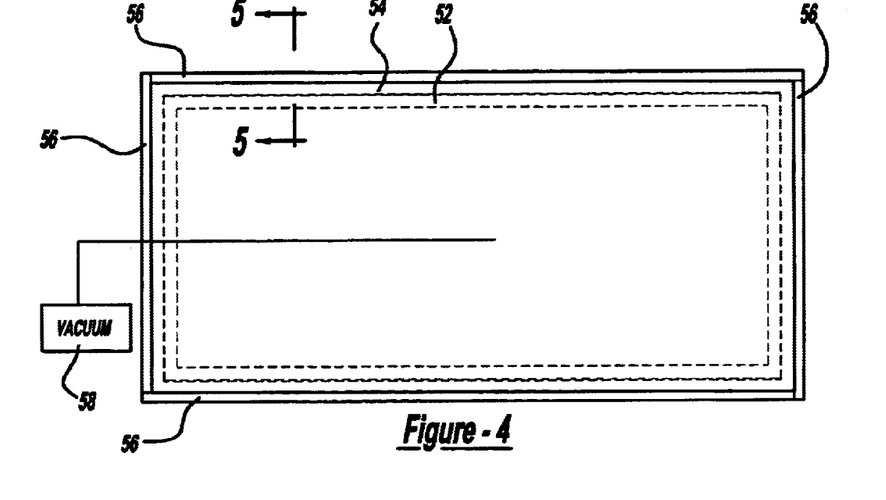
FIG. 4 is a top view of the reinforcing article being attached to a structural element in accordance with the teachings of the present invention.
Figure 5:
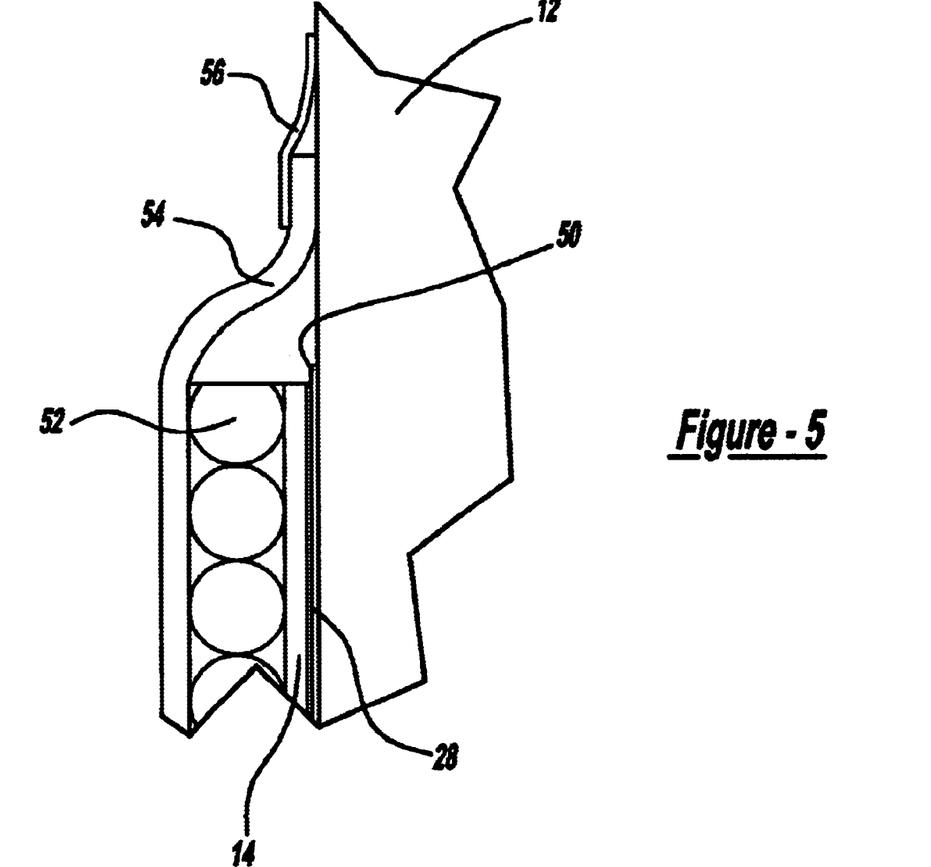
FIG. 5 is a sectional view taken along the line 5—5 in FIG. 4 of the present invention.

As shown in FIGS. 3–5, the strips 10 or rigidified fiber mesh tape 100 are intended to be attached to a structural element 12, such as a concrete block wall, the face 30 of which is being loaded in tension.

In order to attach the strip 10 or rigidified fiber mesh tape 100 to the structural element 12 to reinforce the same, a second epoxy resin 50 is applied to the structural element 12. The second epoxy resin 50 may be of the same kind or different kind from the first epoxy resin 22. The carbon fiber strip 14 or rigidified fiber mesh tape 100, with the plastic sheet 24 removed and the roughened surface 28 exposed, is placed against the front face 30 of the structural member 12 where the second epoxy resin 50 has been applied, such that the roughened surface 28 is contacting the second epoxy resin 50.

In order to ensure that the carbon fiber strip 14 or rigidified fiber mesh tape 100 firmly adheres to the structural element 12, strip 14 or mesh tape 100 should be held in place until the epoxy 50 cures. This is achieved in the method of the present invention by covering the strip 14 or rigidified fiber mesh tape 100 with a sheet of air impermeable material 54, such as a plastic sheet, and by positioning between the impermeable material 54 and the carbon fiber strip 14 or rigidified fiber mesh tape 100 a material 52 which will allow for uniform evacuation of air from between the impermeable material 54 and the structural element 12. In the preferred embodiment, the material 52 is a commercially available bubble wrap, such as that extensively used in the packaging industry. Alternatively, a permeable textile, fabric or other material which will facilitate even evacuation over the strip 14 or rigidified fiber mesh tape 100, may also be used. In the preferred embodiment, any commercially available plastic sheet may be used as the impermeable material 54. The edges of the impermeable material 54 are then sealed to the structural element 12 through adhesives or adhesive strips 56.

With the impermeable material 54 so mounted to the structural element 12 over the carbon fiber strip 14 or rigidified fiber mesh tape 100, air is evacuated through use of a vacuum pump 58 coupled via a vacuum line and fitted to the impermeable sheet 54. Due to the presence of the material 52, when a vacuum is applied, a uniform pressure is applied over the entire strip 14 or rigidified fiber mesh tape 100. The vacuum is applied until the second epoxy resin 50 cures and the strip 14 or rigidified fiber mesh tape 100 firmly adheres to the structural element 12. Under this method, the normal curing time with common epoxies is expected to be about 3–4 hours, after which impermeable material 54 and material 52 are removed. The carbon fiber strip 14 or rigidified fiber mesh tape 100 will thereafter be firmly attached to the structural element 12 providing the desired reinforcement thereto.

In the rigidified fiber mesh tape embodiment of the invention, the second epoxy resin 50 will flow through the spaces between the longitudinal fibers 102 and the lateral fibers 104 such that no thick glue areas are formed. Moreover, as pressure is applied, air will flow through the mesh holes between the fibers 102, 104 preventing air pocket formation. When a plate is utilized according to other methods and is glued to the structural element, the plate and glue can trap air between the carbon fiber plate and the structural element. Air voids are stress risers and a source of micro-cracks. These micro-cracks, once started, may follow the plate surface and can lead to delamination of the plate. Similarly, thick glue areas may form between the carbon fiber plate and the structural element. Since the glue itself fails at a lower force than does the carbon fiber plate or the structural element, these thick glue areas create weak points in the reinforcement.

While the above description constitutes the preferred embodiment of the present invention, it will be appreciated that the invention is susceptible to modification, variation and change without departing from the proper scope and fair meaning of the accompanying claims.

We claim:

1. An article for use in reinforcing a structural element, the article comprising:
   a rigidified mesh tape having a plurality of longitudinal fibers and a plurality of lateral fibers, wherein said fibers are coated in a resin; and
   a sheet removably attached to at least one side of said mesh tape, wherein said sheet when removed exposes a clean roughened surface of said mesh tape.

2. The article of claim 1, wherein said lateral fibers are of a different material than said longitudinal fibers.

3. The article of claim 1, wherein said longitudinal fibers are in tension.

4. The article of claim 1, wherein said longitudinal fibers have a cross sectional shape selected from the group consisting of flat, rectangular, elliptical, round, and oval.

5. The article of claim 1, wherein said lateral fibers have a cross sectional shape selected from the group consisting of flat, rectangular, elliptical, round, and oval.

6. The article of claim 1, wherein said lateral fibers are generally at an angle of between 45 and 90 degrees to said longitudinal fibers.

7. The article of claim 1, wherein said lateral fibers sandwich said longitudinal fibers.

8. The article of claim 1, wherein said lateral fibers are woven to said longitudinal fibers such that said lateral fibers lie alternatingly below and above said longitudinal fibers.

9. The article of claim 1, wherein said lateral fibers are at least on one side of side of said longitudinal fibers.

10. The article of claim 1, wherein said fibers are spaced a sufficient distance apart to allow an adhesive to flow between said fibers.

11. An article for use in reinforcing a structural element, the article comprising:

plurality of longitudinal fibers;

a plurality of lateral fibers interwovenly connected to the longitudinal fibers; and a coating material applied to the woven longitudinal fibers and the lateral fibers; and a sheet removably attached to at least one side of said woven longitudinal and lateral fibers, said longitudinal and lateral fibers defining openings therebetween which are filled with said coating material, wherein said sheet when removed exposes a clean roughened surface of said woven longitudinal and lateral fibers and removes the resin disposed in said openings between said longitudinal and lateral fibers.

12. The article of claim 11, wherein said lateral fibers are of a different material than said longitudinal fibers.

13. The article of claim 11, wherein said longitudinal fibers are in tension.

14. The article of claim 11, wherein said longitudinal fibers have a cross sectional shape selected from the group consisting of flat, rectangular, elliptical, round, and oval.

15. The article of claim 11, wherein said lateral fibers have a cross sectional shape selected from the group consisting of flat, rectangular, elliptical, round, and oval.

16. The article of claim 11, wherein said lateral fibers are generally at an angle of between 45 and 90 degrees to said longitudinal fibers.

17. The article of claim 11, wherein said lateral fibers sandwich said longitudinal fibers.

18. The article of claim 11, wherein said lateral fibers are woven to said longitudinal fibers such that said lateral fibers lie alternatingly below and above said longitudinal fibers.

19. The article of claim 11, wherein said lateral fibers are at least on one side of said longitudinal fibers.

20. The article of claim 11, wherein said fibers are spaced a sufficient distance apart to allow an adhesive to flow between said fibers.

\* \* \* \* \*

UNITED STATES PATENT AND TRADEMARK OFFICE
CERTIFICATE OF CORRECTION

PATENT NO. : 6,846,537 B2 Page 1 of 1
DATED : January 25, 2005
INVENTOR(S) : Donald G. Wheatley and Donald E. Wheatley It is certified that error appears in the above-identified patent and that said Letters Patent is hereby corrected as shown below:

<u>Column 7,</u>
Line 16, after "one side of" delete "side of".

Signed and Sealed this

Thirteenth Day of June, 2006

JON W. DUDAS
*Director of the United States Patent and Trademark Office*